US011670081B2

(12) United States Patent
Chastain et al.

(10) Patent No.: US 11,670,081 B2
(45) Date of Patent: Jun. 6, 2023

(54) PROVIDING HOSPITALITY-RELATED DATA USING AN AUGMENTED REALITY DISPLAY

(71) Applicant: AT&T Intellectual Property I, L.P., Atlanta, GA (US)

(72) Inventors: Walter Cooper Chastain, Atlanta, GA (US); Barrett Kreiner, Woodstock, GA (US); James Pratt, Round Rock, TX (US); Adrianne Luu, Atlanta, GA (US); Robert Moton, Jr., Alpharetta, GA (US); Robert Koch, Peachtree Corners, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 22 days.

(21) Appl. No.: 17/338,639

(22) Filed: Jun. 3, 2021

(65) Prior Publication Data

US 2022/0391617 A1 Dec. 8, 2022

(51) Int. Cl.
*G06V 20/20* (2022.01)
*G06T 11/00* (2006.01)
*G06Q 10/10* (2023.01)
*G06T 7/70* (2017.01)

(52) U.S. Cl.
CPC ............. *G06V 20/20* (2022.01); *G06Q 10/10* (2013.01); *G06T 7/70* (2017.01); *G06T 11/00* (2013.01); *G06T 2207/30204* (2013.01)

(58) Field of Classification Search
CPC .......... G06V 20/20; G06Q 10/10; G06T 7/70; G06T 11/00; G06T 2207/30204
See application file for complete search history.

(56) References Cited

U.S. PATENT DOCUMENTS

| 10,311,614 B2 * | 6/2019 | Mowatt ................... G06F 3/012 |
| 2018/0278462 A1 * | 9/2018 | Bjontegard ........... H04L 41/044 |
| 2019/0098504 A1 * | 3/2019 | Van Betsbrugge ......................... H04W 12/041 |
| 2019/0188796 A1 * | 6/2019 | Sauer .................... G06Q 20/102 |
| 2021/0272471 A1 * | 9/2021 | Kolling ................ A47L 9/2826 |
| 2021/0345040 A1 * | 11/2021 | Meyer .................... H04R 3/005 |
| 2022/0208367 A1 * | 6/2022 | Davidson ............... A61B 90/90 |

FOREIGN PATENT DOCUMENTS

| CN | 109241900 A | * | 1/2019 | ............. G06V 20/20 |
| WO | WO 2018065229 A1 | * | 4/2018 | ........... H05B 47/175 |

* cited by examiner

*Primary Examiner* — Ryan R Yang

(57) ABSTRACT

In one example, a method performed by a processing system including at least one processor includes identifying an environment surrounding a user of an augmented reality display, identifying a relative location of the user within the environment, determining a field of view of the augmented reality display, identifying a room within the field of view, querying a data source for current information about the room, and modifying the augmented reality display to present the current information about the room.

20 Claims, 4 Drawing Sheets

PROVIDING HOSPITALITY-RELATED DATA USING AN AUGMENTED REALITY DISPLAY

The present disclosure relates generally to augmented reality (AR) systems, and relates more particularly to devices, non-transitory computer-readable media, and methods for providing hospitality-related data using an augmented reality display.

BACKGROUND

Augmented reality (AR) comprises a subset of extended reality (XR) technology in which objects that reside in the real world are augmented with computer-generated information. AR may thus be used to enhance real world environments or situations and offer perceptually enriched or immersive experiences.

SUMMARY

In one example, the present disclosure describes a device, computer-readable medium, and method for providing information about members of a group using an interactive augmented reality display. For instance, in one example, a method performed by a processing system including at least one processor includes identifying an environment surrounding a user of an augmented reality display, identifying a relative location of the user within the environment, determining a field of view of the augmented reality display, identifying a room within the field of view, querying a data source for current information about the room, and modifying the augmented reality display to present the current information about the room.

In another example, a non-transitory computer-readable medium stores instructions which, when executed by a processing system, including at least one processor, cause the processing system to perform operations. The operations include identifying an environment surrounding a user of an augmented reality display, identifying a relative location of the user within the environment, determining a field of view of the augmented reality display, identifying a room within the field of view, querying a data source for current information about the room, and modifying the augmented reality display to present the current information about the room.

In another example, a device includes a processing system including at least one processor and a computer-readable medium storing instructions which, when executed by the processing system, cause the processing system to perform operations. The operations include identifying an environment surrounding a user of an augmented reality display, identifying a relative location of the user within the environment, determining a field of view of the augmented reality display, identifying a room within the field of view, querying a data source for current information about the room, and modifying the augmented reality display to present the current information about the room.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
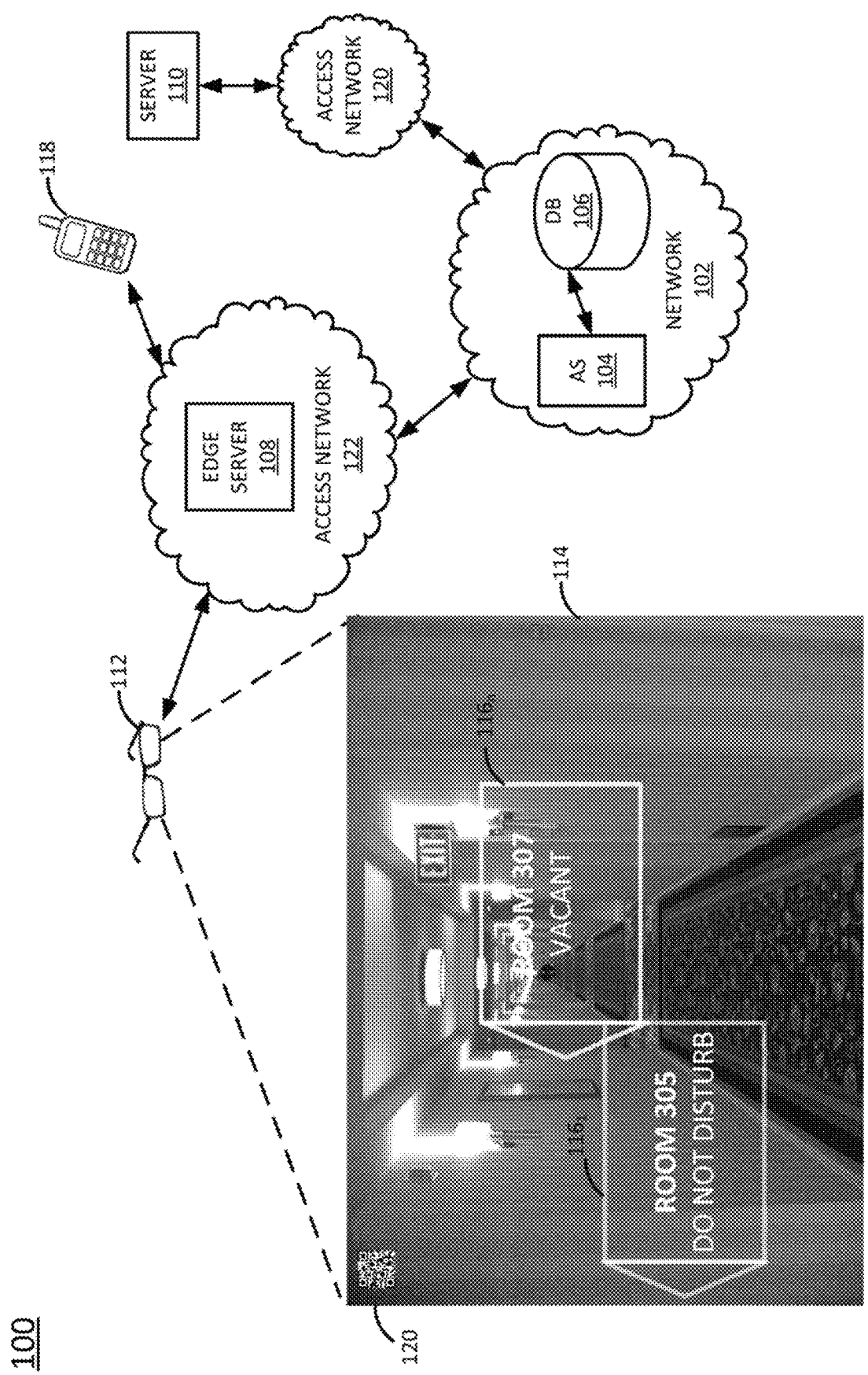
FIG. 1 illustrates an example system in which examples of the present disclosure may operate.

In one example, the present disclosure provides interactive augmented reality (AR) displays which may be used to present hospitality-related data to staff of a hotel (e.g., housekeeping, room service, maintenance, conference room workers, etc.) or similar operation. As discussed above, AR comprises a subset of extended reality (XR) technology in which objects that reside in the real world are augmented with computer-generated information. As such, AR technologies may be well suited to industries in which information about different customers or groups of customers needs to be conveyed to an individual who is providing services to the customers, such as the travel and hospitality industries (e.g., in hotels).

Examples of the present disclosure provide a system which presents hospitality-related data to staff of a hotel or similar operation via an AR display, such as a pair of AR glasses. In particular, a database may store information about a plurality of rooms or other spaces assigned to a plurality of customers of a hotel (or other businesses in which customers may be assigned to separate private or semi-private spaces), and an AR server (e.g., an application server) may access the database to retrieve information that relates to the service needs of the rooms. For instance, the information may indicate which rooms are presently vacant or occupied, which rooms need cleaning or extra supplies (e.g., towels, shampoo, etc.), or other needs. The information may be formatted by the AR server for presentation on an AR display belonging to the user, such as a pair of AR glasses that the user is wearing. The information may help the user to provide services to the customers occupying the rooms, without the user having to set foot in the rooms to determine the customers' needs (i.e., the information may be provided to a user who is outside the room(s)). The interactive AR display may be used, for example, by housekeeping staff who are cleaning rooms, maintenance personnel who are making repairs to items in the rooms, room service staff who may be delivering food and drinks to the rooms, staff who are setting up conference rooms for events, and the like.

Although the term "room" is used to provide context for certain examples discussed here, it will be appreciated that the examples of the present disclosure are not limited to applications involving hotel rooms. For instance, examples of the present disclosure could be used to improve service to customers occupying any sort of private or semi-private space maintained by a business. These private or semi-private spaces may include hotel rooms, but also may include cruise ship cabins, sleeper train compartments, airport "sleep pods," cabanas at beach clubs, pool clubs, or theme parks, conference rooms in hotels or office buildings, private rooms in restaurants or karaoke bars, offices in an office building, and the like. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, 3$^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
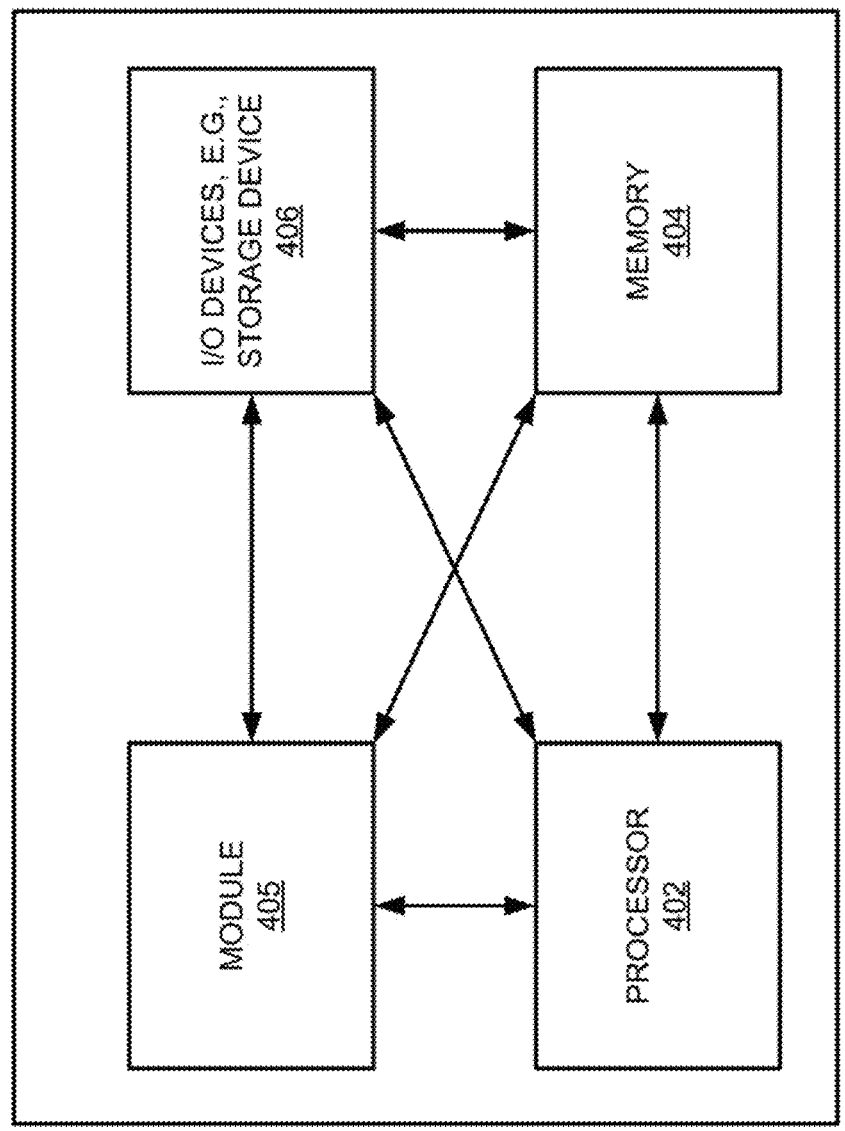
FIG. 4 depicts a high-level block diagram of a computing device specifically programmed to perform the functions described herein.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for providing interactive augmented reality (AR) displays which may be used to present hospitality-related data. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for providing interactive augmented reality (AR) displays which may be used to present hospitality-related information. For instance, the AS 104 may host an application that communicates with a remote augmented reality display (e.g., display 112, discussed in greater detail below) in order to present information to a user in an interactive and/or immersive manner. For instance, in one example, the augmented reality display 112 may be a pair of AR glasses worn by a user who is part of the hospitality staff of a hotel, a theme park, a beach or pool club, a cruise ship, a sleeper train, or the like. The augmented reality display 112 may send information about a user's current environment 114 (e.g., identifiers of AR markers, room numbers, or the like detected by the augmented reality display 112). Based on the information about the user's current environment 114 (which, in the example of FIG. 1, is the hallway of a hotel), the AS 104 may identify one or more rooms within the user's current environment 114 and/or field of view (e.g., in the example environment 114, a plurality of hotel rooms located along the hallway). The AS 104 may then retrieve and provide information about the spaces to the augmented reality display 112 for display to the user. For instance, in one example, the AS 104 may generate one or more digital overlays 116$_1$-116$_n$ (hereinafter individually referred to as a "digital overlay 116" or collectively referred to as "digital overlays 116") containing the information, where the augmented reality display 112 may present the digital overlays 116 on the surface a pair of AR glasses (e.g., such that the information is superimposed over the view of the real world through the AR glasses). In another example, the AS 104 may simply provide information to the augmented reality display 112, and the augmented reality display 112 may generate the digital overlays 116 locally using the provided information.

Each digital overlay 116 may provide information about one room of the plurality of rooms in the field of view and may be positioned proximate to the space to which the digital overlay 116 refers. Alternatively, a single digital overlay may be generated that contains multiple digital objects (e.g., text boxes or the like) positioned in different locations (e.g., proximate to the spaces to which the text boxes refer). For instance, in FIG. 1, each example digital overlay 116 identifies a specific hotel room (e.g., Room 305, Room 307, etc.) and presents information about the status of the corresponding hotel room (e.g., the occupants of Room 305 do not want to be disturbed, while Room 307 is vacant).

In one example, AS 104 may comprise a physical storage device (e.g., a database server), to store information about the different rooms. The information may comprise a plurality of different types of information. For instance, the information may comprise reservation information for the rooms (e.g., current and future reservations for the rooms). The information may additionally comprise current occupant information (e.g., information about customers who are currently checked in/occupying the rooms). The information may also comprise historical usage information (e.g., information related to past activity associated with a room and/or the customers occupying the room).

In another example, the DB 106 (or multiple instances of the DB 106) may store the information about the different rooms, and the AS 104 may retrieve the information from the appropriate DB 106 when needed. For example, separate databases may store the information for the rooms, the current occupant information, and the historical usage information. In a further example, each different organization that provides private or semi-private spaces for customers may maintain a separate database that stores information about the spaces provided and occupants of those spaces. For instance, one database may store information about the customers of a first hotel chain; another database may store information about the customers of a second hotel chain; another database may store information about the customers of a cruise line; and the like.

In one example, each DB 106 may maintain a profile for each room for which information is maintained. The profile may include one or more of the following items of information: occupancy status of the room (e.g., whether someone is checked into the room and currently present in the room, or checked into the room but not currently present in the room, or whether no one is checked into the room), the last time someone was checked into the room, the next time someone is scheduled to check into the room, the identity of the person or people currently checked into the room, any messages or requests received from the room's current occupants (e.g., service or maintenance requests), sensor data recorded by sensors in the room (including sensors which may be integrated in the occupant's devices 118, such as the occupant's phone or smart watch), service tasks scheduled to be performed in the room and estimated lengths of time for the service tasks, and other information. At least some of the information stored in the profile may be stored in encrypted form to protect the privacy of the room's occupant(s).

In a further example, the individual profiles may not be stored in a centralized location such as a server or database. Instead, the profiles may be stored on individual devices within the rooms, and the AS 104 may retrieve the profiles directly from these devices (e.g., with the consent of the users if these devices are personal devices of the users). For ease of illustration, various additional elements of network 102 are omitted from FIG. 1.

Figure 3:
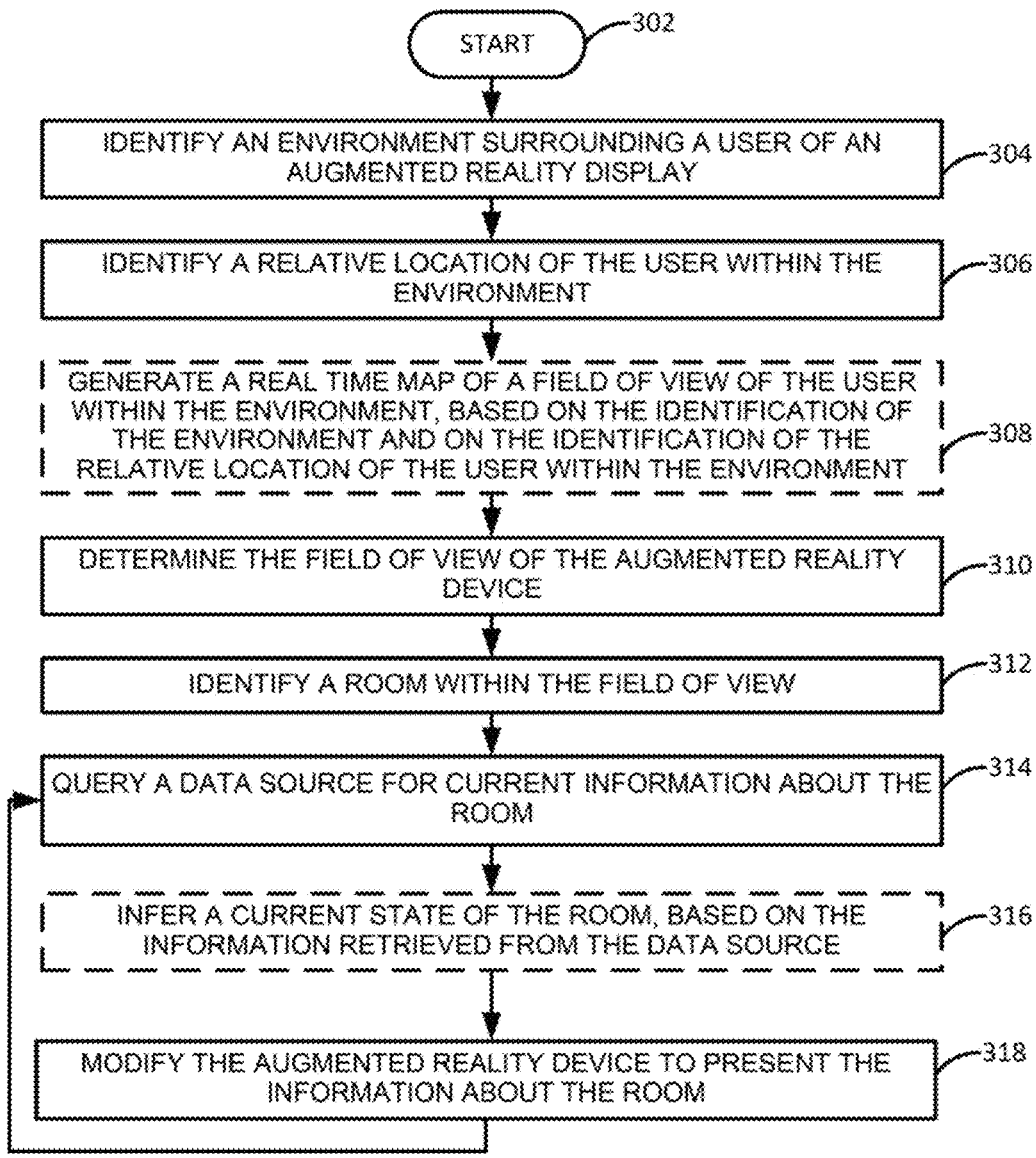
FIG. 3 illustrates a flowchart of an example method for providing an interactive augmented reality display which may be used to present hospitality-related information in accordance with the present disclosure.

In one example, access network 122 may include an edge server 108, which may comprise a computing system or server, such as computing system 400 depicted in FIG. 4, and may be configured to provide one or more operations or functions for providing interactive augmented reality (AR) displays which may be used to present hospitality-related information, as described herein. For instance, an example method 300 for providing an interactive augmented reality (AR) display which may be used to present hospitality-related information is illustrated in FIG. 3 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, including, e.g., an interactive augmented reality display 112 (hereinafter also referred to as a "display 112") and other devices such as a mobile device, a cellular smart phone, a wearable computing device (e.g., smart glasses, a virtual reality (VR) headset or other types of head mounted display, or the like), a laptop computer, a tablet computer, or the like. Access networks 120 and 122 may transmit and receive communications between server 110, display 112, other devices, application server (AS) 104, other components of network 102, devices reachable via the Internet in general, and so forth. In one example, display 112 may comprise a pair of glasses or eyewear (e.g., smart glasses, a gaming headset, a head mounted display, or the like) having built-in display elements that may present digitally created objects in a manner such that, when the digitally created objects are viewed simultaneously with the real world objects visible through the lenses of the glasses, and augmented reality display is created. In one example, display 112 may comprise a computing system or device, such as computing system 400 depicted in FIG. 4, and may be configured to provide one or more operations or functions in connection with examples of the present disclosure for providing interactive augmented reality (AR) displays which may be used to present hospitality-related information.

Figure 2:
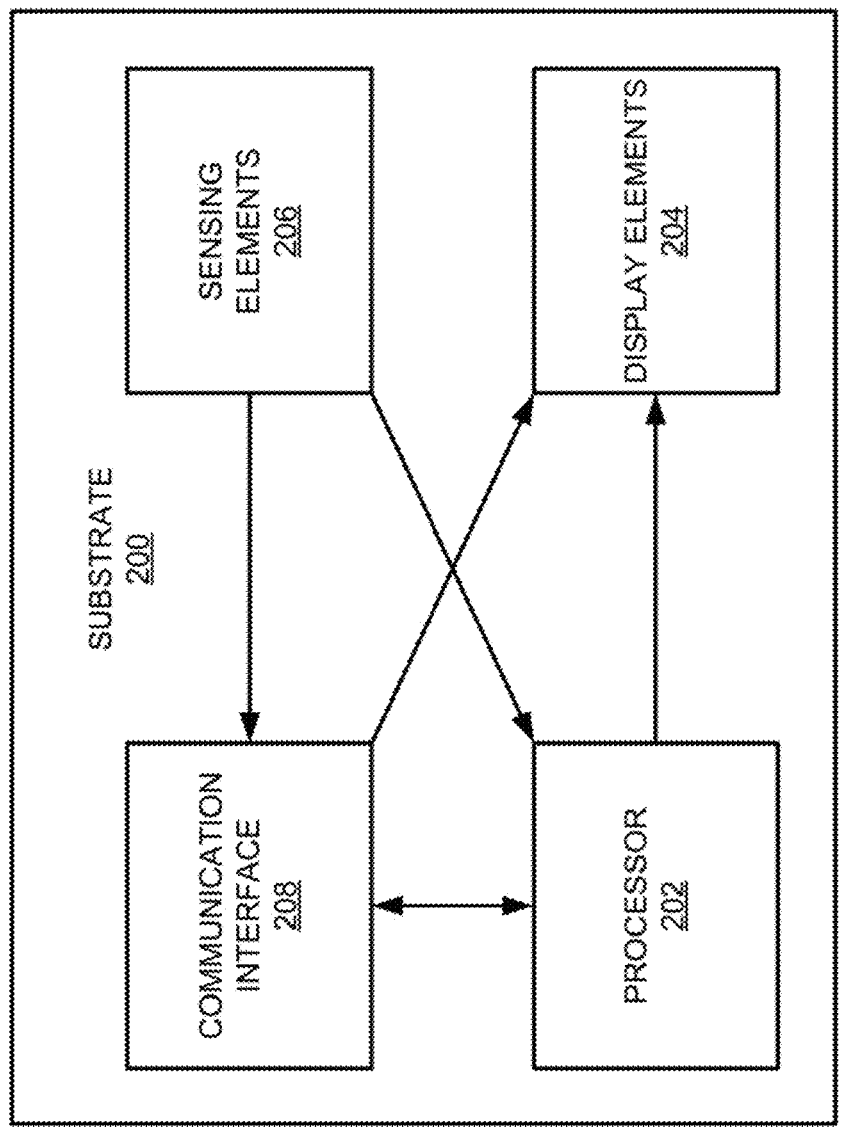
FIG. 2 illustrates one example configuration of the display of FIG. 1 which has been configured as a pair of glasses.

As discussed above, in one particular example, the display 112 comprises a pair of glasses, i.e., a transparent lens or set of lenses made to be wearable by the user (e.g., over the user's eyes). FIG. 2, for instance, illustrates one example configuration of the display 112 of FIG. 1 which has been configured as a pair of glasses. For instance, the display 112 may comprise a transparent substrate 200 (i.e. a lens or a set of lenses) in which a processor 202, a plurality of display elements 204, a plurality of sensing elements 206, and a communication interface 208 are embedded. The processor 202 may comprise, for example, a microprocessor, a central processing unit (CPU), or the like. The processor 202 may be in communication with, and may in some cases control operations of, the plurality of display elements 204, the plurality of sensing elements 206, and the communication interface 208.

The plurality of display elements 204 may comprise a plurality of pixels or similar display elements (e.g., display elements that are capable of emitting light and/or color). Each display element of the plurality of display elements 204 may be independently addressable by the processor 202. Thus, the processor 202 may send signals to specific display elements that may cause the specific display elements to change their appearances (e.g., change color, change the intensity of the light emitted, etc.). When all of the specific display elements addressed by the processor 202 change their appearances as instructed by the processor 202, the specific display elements may collectively form a desired image.

The plurality of sensing elements 206 may comprise a plurality of different types of sensors. For instance, the plurality of sensing elements 206 may include one or more of: image sensors (e.g., cameras), audio sensors (e.g., microphones), proximity sensors (e.g., infrared sensors, radio frequency ID sensors, and the like), and touch sensors (e.g., capacitive touch sensors, resistive touch sensors, and the like). In another example, the plurality of sensing elements 206 may also include short range wireless antennas (e.g., Bluetooth antennas, ZigBee antennas, Impulse Radio Ultra Wide Band (IR-UWB) antennas, and the like). The plurality of sensing elements 206 may provide streams of raw sensor data to the processor 202 for further analysis and processing. In one example, additional sensing elements 206 may be located externally to (e.g., not embedded in) the augmented reality display 112. For instance, additional sensing elements may be located throughout a room, a vehicle, or the like in which the augmented reality display 112 is deployed.

The communication interface 208 may comprise circuitry that allows the display 112 to communicative with one or more external devices (e.g., over short range or long range wireless protocols). For instance, the communication interface 208 may allow the processor 202 to send data to and receive data from a remote server (e.g., AS 104 and/or server 110), a mobile device that is in proximity to (e.g., within detection range of a short range wireless antenna of) the display 112 (e.g., a user's mobile phone, smart watch, augmented reality glasses, or the like). Thus, the communication interface 208 may comprise one or more transceivers, antennas, network access cards, and/or interfaces that facilitate communication with other devices.

In one example, server 110 may comprise a network-based server for providing an interactive augmented reality (AR) display which may be used to present hospitality-related information. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an AR system operated by an entity that is not a telecommunications network operator. For instance, a provider of an AR system may operate server 110 and may also operate edge server 108 in accordance with an arrangement with a telecommunication service provider offering edge computing resources to third-parties. However, in another example, a telecommunication network service provider may operate network 102 and access network 122, and may also provide an AR system via AS 104 and edge server 108. For instance, in such an example, the AR system may comprise an additional service that may be offered to subscribers, e.g., in addition to network access services, telephony services, traditional television services, and so forth.

In an illustrative example, an AR system may be provided via AS 104 and edge server 108. In one example, a user may engage an application on display 112 to establish one or more sessions with the AR system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eU-TRAN), an evolved packet core (EPC) network, etc., a 5G network, etc.). Thus, the communications between display 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, display 112 may communicate with access network 122, network 102, the Internet in general, etc., via a WLAN that interfaces with access network 122.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 3 illustrates a flowchart of an example method 300 for providing an interactive augmented reality (AR) display which may be used to present hospitality-related information in accordance with the present disclosure. In one example, the method 300 may be performed by a server that is configured to generate digital overlays that may be superimposed over images of a "real world" environment viewed through the lens(es) of an AR device (e.g., a pair of AR glasses) to produce an augmented reality display, such as the AS 104 or server 110 or display 112 illustrated in FIG. 1. However, in other examples, the method 300 may be performed by another device, such as the AR device itself or the processor 402 of the system 400 illustrated in FIG. 4. For the sake of example, the method 300 is described as being performed by a processing system.

The method 300 begins in step 302 and proceeds to step 304. In step 304, the processing system may identify an environment surrounding a user of an augmented reality display. As discussed above, in one example, the augmented reality display may comprise a pair of AR glasses having display elements embedded in a transparent lens or set of lenses, such that augmented reality content may be presented to the user without obstructing the user's view of objects through the glasses. The user may be wearing the AR glasses, where the AR glasses are designed to assist the user with providing hospitality-related services to occupants of a plurality of rooms (i.e., rooms of a hotel, cabins of a cruise ship, cabanas of a pool or beach club, etc.). The identifying may be initiated in response to a signal from the user, such as the user pushing a button on the augmented reality display or another device that is communicatively coupled to the processing system (e.g., the user's mobile phone or smart watch), or the user powering on the augmented reality display.

In one example, identifying the environment may comprise detecting one or more AR markers that are positioned in fixed locations within the environment, where the markers may uniquely identify the environment (as well as, potentially, specific locations within the environment, e.g., each AR marker defining a specific geographic location within the environment, e.g., longitude and latitude coordinates with elevation information and the like). For instance, FIG. 1 illustrates an example AR marker 120 which is located in an environment 114 comprising a hotel hallway. In this case, AR markers 120 may be located on some or all of the doors in the hallway, some or all of the walls, on emergency exits, on signs, and/or on other surfaces within the hallway. By detecting one or more of AR markers 120, the processing system may be able to identify the specific environment surrounding the user (e.g., by matching the markers to reference points in a stored map of the hallway of the hotel). In other examples, however, other techniques may be used to identify the environment, including marker-less and/or location-based AR techniques.

In one example, the augmented reality device may be pre-programmed to operate in (and to recognize) a plurality of different environments. For instance, where the augmented reality device comprises a pair of AR glasses for use by the hospitality staff of a hotel, the AR glasses may be pre-programmed to operate on a plurality of different floors of the hotel having different layouts (e.g., floors that are all guest rooms, floors that include conference rooms, restaurants, fitness centers, pools, or the like, etc.). Where the augmented reality device comprises a pair of AR glasses for use by hospitality staff of a cruise ship, the AR glasses may be pre-programmed to operate for a plurality of different ships within the fleet.

In one example where the processing system is part of the augmented reality display, identifying the environment may be performed locally (e.g., by matching AR markers or other features to features of a stored location that the augmented reality display is pre-programmed to operate in). In an example where the processing system is part of a remote server, the remote server may receive signals containing images or other data (e.g., AR markers) relating to the environment from the augmented reality display, and the remote server may identify the environment and provide the identification of the environment to the augmented reality display.

In step 306, the processing system may identify a relative location of the user (or, more specifically, of the AR device worn by the user) within the environment. In one example, the relative location of the user is determined based on knowledge of a map of the environment (e.g., as discussed above) and detection of the one or more AR markers 120, which may help the processing system to determine the user's location. In other words, knowing the layout of the environment, as well as the locations of specific AR markers 120 within the environment, may help the processing system to determine where the user is located, as well as a direction in which the user is looking or facing. For instance, if the position of the user relative to an AR marker can be determined, and a fixed location in the environment that is associated with the AR marker is known, then the relative location of the user within the environment can also be determined.

As with step 304, where the processing system is part of the augmented reality display, identifying the relative location may be performed locally by the augmented reality display based on the identification of the environment and the AR markers. Where the processing system is part of a remote server, the identifying may be performed by the server based on signals received from the augmented reality display, where the signals may contain images of the user's field of view (e.g., including images of one or more AR markers or other features having known, fixed locations, such as room numbers posted on doors or hallway signs) that allow the remote server to orient the user within the environment. The remote server may then respond to the augmented reality display with the identification of the user's relative location.

In optional step 308 (illustrated in phantom), the processing system may generate a real time map of a field of view of the user within the environment, based on the identification of the environment and on the identification of the relative location of the user within the environment. In one example, the real time map may include location anchors to assist with orientation of the user within the environment. The real time map need not necessarily be displayed to the user, but may be stored and used by the processing system to determine where to position AR content within the user's field of view as discussed in greater detail below.

As with the previous steps, where the processing system is part of the augmented reality display, generating the real time map may be performed locally by the augmented reality display based on the identification of the environment and the relative location of the user. Where the processing system is part of a remote server, the generating may be performed by the server based on signals from the augmented reality display, where the signals may contain images of the user's field of view that allow the remote server to orient the user within the environment. The remote server may then respond to the augmented reality display with the real time map.

In step 310, the processing system may determine the field of view of the augmented reality display. In one example, the field of view may be determined using the real time map generated in step 308. Alternatively, the field of view may be determined based on knowledge of the relative location of the user within the environment plus knowledge of the orientation (e.g., x, y, z coordinates and/or yaw, pitch, and roll) of the augmented reality display, which may be determined using data collected by sensors (e.g., gyroscopes, accelerometers, image sensors, etc.) of the augmented reality display.

As with previous steps, where the processing system is part of the augmented reality display, determining the field of view may be performed locally by the augmented reality display based on the real time map or other information. Where the processing system is part of a remote server, the determining may be performed by the server based on signals from the augmented reality display, where the signals may contain images of the user's field of view or coordinates of the augmented reality display that allow the remote server to orient the user within the environment. The remote server may then respond to the augmented reality display with the field of view.

In step 312, the processing system may identify a room within the field of view. In one example, the processing system may analyze data from one or more sensors in order to identify the room. For instance, images from an imaging sensor may be analyzed using text or object recognition techniques in order to identify the room numbers posted on doors, walls, or signs, or to recognize other text or features posted on signs. In another example, a signal detected by a short range wireless beacon (e.g., RF identification tags (active or passive) mounted to a wall or other structures) may be analyzed to extract an identifier that is mapped to a specific location (e.g., third floor northwest hallway, fitness center, Conference Room A, etc.) within the environment.

Where the processing system is part of the augmented reality display, identifying the room may comprise sending identifying data (e.g., images, wireless beacon signals, global positioning system or other coordinates, etc.) to a remote server for further analysis or database query. Where the processing system is part of a remote server, the identifying may be performed by the server based on signals from the augmented reality display, where the signals may contain identifying data of the room. The remote server may then respond to the augmented reality display with the identification of the room.

In step 314, the processing system may query a data source for current information about the room. In one example, the data source may comprise a remote database, or multiple remote databases. The remote database(s) may maintain information about rooms within the environment (e.g., rooms in a hotel, cabins on a cruise ship, cabanas in a pool club, beach club, or theme park, etc.). The remote database(s) may also maintain information about occupants associated with the room.

In one example, the current information about the room may include at least one of the following types of information which may be retrieved from a database: whether the room is currently occupied or vacant, an identity of a current occupant of the room (e.g., who is checked in), and any messages sent by the occupant of the room (e.g., where the messages may indicate, for example, that the occupant does not want to be disturbed before a specific time, that the occupant is planning to leave the room at a specific time, that the occupant has requested a specific type of service, or the like).

In another example, the current information about the room may include a sensor reading captured by at least one of the following types of sensors located within the room: a door sensor, a motion sensor, a vibration sensor, a temperature sensor, a weight sensor, a short range wireless transceiver, or the like. These sensors may be distributed throughout the room, such as in the furniture, on the walls or doors, in the occupant's devices (e.g., mobile phone, smart watch, etc.) and the like. In one example, the occupant of a room may opt into the use of these sensors with the occupant's consent. That is, the processing system may be prohibited from querying the sensors for data without the occupant's explicit consent. In some examples, the occupant may consent to certain types of sensors providing data to the processing system (e.g., door sensors), but not consent to other types of sensors providing data to the processing system (e.g., temperature sensors). Thus, the occupant may control the types of information that may be monitored within the room and may balance their individual needs for privacy with their needs for hospitality-related services. In one example, any sensor readings may be timestamped with the times at which the readings were captured. Sensor readings that are older than some threshold period of time (based on their timestamps) may be deleted from the data source.

In another example, the current information about the room may include information about the occupant of the room, which may be obtained from messages sent by the occupant to the AR server, databases maintained by other service providers (e.g., airlines, shuttle or rideshare services, restaurants, etc.), and alerts or messages sent to the occupant's devices which the occupant may choose to share with the AR server (e.g., flight alerts from an airline). For instance, the information may include data such as the status of a flight that the occupant is scheduled to be on, a restaurant reservation that the occupant has made, or the estimated time of arrival for a rideshare that the occupant has ordered.

As in previous steps, where the processing system is part of the augmented reality display, querying the data source may be performed locally by the augmented reality display communicating directly with the data source. Where the processing system is part of a remote server, the querying may be performed by the server based on signals from the augmented reality display, where the signals may contain an identification of the room. The remote server may then respond to the augmented reality display with any data matching the query or with augmented reality content created from the matching data, as described in further detail below.

In optional step 316, the processing system may infer a current state of the room, based information retrieved from the data source in step 314. In one example, the current state of the room may include one of the following states: vacant (i.e., no one is currently checked into the room), away (i.e., someone is currently checked into the room, but he or she is not currently inside the room), and occupied (i.e., someone is currently checked into the room and is currently inside the room).

As discussed above, sensors integrated into the individual's devices or otherwise located within the room may collect information from which the room's current state can be inferred. For instance, motion sensors located in the room may monitor movements within the room; based on readings from these motion sensors, the processing system may infer that the room's occupant is currently present in the room. Similarly, a weight sensor embedded in a piece of furniture (e.g., a bed, a chair, or the like) may monitor the weight that is applied to the piece of furniture; based on readings from the weight sensor, the processing system may infer that the room's occupant is currently present in the room (e.g., is sleeping in the bed, sitting in a chair, or the like).

In further examples, a thermal imaging sensor or other types of temperature sensor may provide thermal images or information from which the processing system may determine whether the room's occupant is currently present in the room. A noise sensor may monitor the decibel level of noise within the room; based on readings from the noise sensor, the processing system may determine that the room's occupant is currently present in the room (e.g., from decibel levels or noise patterns that indicate snoring, typing on a computer, running water, etc.). Thus, the presence of an occupant within a room could be determined by certain types of imaging and/or audio sensors in a minimally intrusive manner (i.e., without capturing images or voice samples from which private information might be extracted).

In a further example, the current state may also include inferred service needs of the room which may not have been explicitly expressed by the room's occupant. For instance, a weight sensor may detect that a weight that was applied to the bed for several hours (e.g., overnight) is no longer detected, which may indicate that the bed was slept in and that the linens should be changed. A temperature sensor may detect a temporary increase in the ambient temperature within the bathroom, which may indicate that the shower was run and that the bathroom should be cleaned. A motion or weight sensor in the minibar may detect (and optionally identify) items that were removed from the minibar and need to be replaced.

In a further example, the current state may also include an estimate of how much time it may take to address any explicitly expressed and/or inferred service needs of the room. For instance, certain tasks may be mapped (e.g., in a database) to estimated amounts of time that those tasks may take to complete. As an example, changing the linens on a bed may be associated with a first period of time, vacuuming a floor may be associated with a second period of time, washing a bathtub may be associated with a third period of time, and so on. Once the service needs of a room have been identified, the processing system may look up the periods of time associated with the tasks that should be performed to address the service needs, and may then generate a total estimate of the time needed to address the service needs of the room (e.g., by summing the individual periods of time for the individual tasks).

As in the previous steps, where the processing system is part of the augmented reality display, inferring the current state of the room may be performed locally by the augmented reality display based on the information retrieved from the data source. Where the processing system is part of a remote server, the inferring may be performed by the server using the provided by the data source, the sensors, and/or the augmented reality display. The remote server may then communicate any inferred state of the room to the augmented reality display.

In step 318, the processing system may modify the augmented reality display to present the information about the room. For instance, the processing system may generate a digital overlay that may be presented by altering the appearance of the display elements that are embedded in the augmented reality display and may send this digital overlay to the augmented reality display. As an example, the processing system may generate a digital overlay that includes text and/or images about the room that may help the user to provide better service to the occupants of the room.

As an example, if the room is scheduled to be cleaned before a new occupant checks in, the digital overlay may include text or imagery indicating whether the last occupants have checked out yet and how long it is expected to take to clean the room for the new occupant. If the current occupant of the room has requested new towels, the digital overlay may include text or imagery indicating that new towels should be provided to the room as soon as possible. If the occupant is on an important phone call inside the room, the digital overlay may include text or imagery indicating that the user should not enter the room or knock on the door until otherwise notified. If an occupant is expected to check into the room but has not yet done so, the digital overlay may include text or imagery indicating the name, number of people in the occupant's party, and/or the occupant's expected time of check in. If the occupant of the room is scheduled to be on a flight that has been delayed, which may in turn delay the occupant's check out time, then the digital overlay may include text or imagery indicating the updated check out and flight times. If the occupant of the room has gone to the hotel restaurant for breakfast, then the digital overlay may include text or imagery indicating an expected time at which the occupant is expected to return to the room (e.g., based on the time the occupant left the room and/or current service times in the restaurant). If the occupant of the room has set their privacy status so that some or all of their information are blocked from access or display, then the digital overlay may simply indicate whether or not someone is currently checked into the room.

In one example, the information presented in step 318 may be sorted. For instance, where a plurality of rooms in the environment have service needs which the user is to address, the processing system may provide a suggested order in which to address the service needs of the plurality of rooms in order to make most efficient use of the availability of the rooms. The suggested order may be based on the respective estimates of the amounts of time needed to address the needs of the plurality of rooms and/or respective estimates of how long the rooms are likely to be vacant, among other factors. For instance, suppose that Room 305 and Room 307 both need to be cleaned, but that the estimated time to clean Room 305 is longer than the estimated time to clean Room 307. In some cases, the user might prefer to first clean the room whose estimated cleaning time is shorter, e.g., new guests are arriving imminently and there are insufficient cleaned empty rooms. However, if the occupants of Room 305 are expected to return to their room before the occupants of Room 307 are expected to return to their room, then it may make more sense to clean Room 305 first, despite the longer estimated cleaning time. Thus, the processing system may modify the AR display to indicate that the user should clean Room 305 before Room 307. The processing system may also modify the AR display to provide an indication of the next task to be performed after Room 305 is cleaned (e.g., clean Room 307 next, bring new towels to Room 315 next, etc.).

As in the previous steps, where the processing system is part of the augmented reality display, generating the digital overlay may be performed locally by the augmented reality display based on the information about the room (which may be obtained by the augmented reality display directly from the data source or indirectly via the remote server). Where the processing system is part of a remote server, the digital overlay may be generated by the server and forwarded to the augmented reality display for use.

The method 300 may return to step 314 and continue to monitor and present information about the room until such time as the user requests that monitoring be stopped or powers off or removes the augmented reality display. Moreover, the method 300 may be repeated for any number of rooms in proximity to the user. For instance, FIG. 1 illustrates a digital overlay that presents information for two adjacent rooms, but information for any number of rooms may be presented simultaneously (and optionally sorted or prioritized as described above).

In further examples, the augmented reality display could be used to present view of when a room was last cleaned. For instance, historical reservation data stored in the data source could be analyzed to determine the last time a particular room was cleaned. If the room has not been occupied for a long time, and was last cleaned the last time an occupant checked out of the room, then this may indicate that the room should be cleaned again before a new occupant checks into the room. Similarly, some individuals may prefer rooms that have not been occupied for some time prior to the individual's check in, since a period of vacancy may indicate the presence of fewer airborne pathogens. In this case, the augmented reality display could be used to present a view of the last time a room was occupied (or the last time anyone, whether a guest or a member of the hospitality staff, was in the room).

In further examples, the sensors used to provide data to the AR system may also be used to improve service to the occupants of rooms in other ways. For instance, a microphone or other audio sensors placed in one room may be able to monitor for sound bleeding through from adjacent rooms (e.g., the room next door has the volume of its television turned up, or a loud alarm is going off, etc.). In this case, if it is detected that sound originating in a first room can be detected in a second room, a centralized processing system or server may be able to control the source of the sound in the first room to lower the volume to a level where the sound is not audible outside of the first room (e.g., may lower the volume of the television or of an alarm clock, etc.). Alternatively, the processing system may control a speaker in the second room to emit a sound that cancels the sound from the first room.

Although the method 300 is described above as being performed by the augmented reality display or by the remote server, it will be appreciate that some steps of the method 300 could be performed by the augmented reality display, while other steps could be performed by the remote server. For instance, the augmented reality display may collect data about a room in the field of view, and send the data to the remote server for identification and query of the data source. The remote server may then send information about the room to the augmented reality display, and the augmented reality display may format the information into AR content for display to the user. Other examples in which the steps of the method 300 are distributed between the augmented reality display and the remote server are also contemplated within the scope pf the present disclosure.

Although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 300 may be implemented as the system 400. For instance, a server or an augmented reality display could be implemented as illustrated in FIG. 4.

As depicted in FIG. 4, the system 400 comprises a hardware processor element 402, a memory 404, a module 405 for providing an interactive augmented reality display, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for providing an interactive augmented reality display may include circuitry and/or logic for performing special purpose functions relating to the operation of a home gateway or XR server. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing an interactive augmented reality display (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing an interactive augmented reality display (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    identifying, by a processing system including at least one processor, an environment surrounding a user of an augmented reality display;
    identifying, by the processing system, a relative location of the user within the environment;
    determining, by the processing system, a field of view of the augmented reality display;
    identifying, by the processing system, a plurality of rooms within the field of view, wherein the user is located outside of the plurality of rooms;
    querying, by the processing system, a data source for current information about the plurality of rooms; and
    modifying, by the processing system, the augmented reality display to present the current information about the plurality of rooms in a single display.

2. The method of claim 1, wherein each room of the plurality of rooms is at least one of: a hotel room in a hotel, a cabin on a cruise ship, a sleeping compartment on a sleeper train, a cabana in a pool club, a cabana in a beach club, a cabana in a theme park, a sleeping pod in an airport, a conference room in a hotel, a conference room in an office building, a private room in a restaurant, or a private room in a bar.

3. The method of claim 1, wherein the current information about the plurality of rooms includes, for each room of the plurality of rooms, at least one of: whether the each room is currently occupied or vacant, an identity of a current occupant of the each room, or any messages sent by the current occupant of the each room.

4. The method of claim 3, wherein the any messages indicates at least one of: the current occupant does not want to be disturbed before a specific time, the current occupant is planning to leave the each room at a specific time, or the current occupant has requested a specific type of service.

5. The method of claim 1, wherein the current information about the plurality of rooms includes information collected from a plurality of sensors within the plurality of rooms.

6. The method of claim 5, wherein the plurality of sensors includes at least one of: a door sensor, a motion sensor, a vibration sensor, a temperature sensor, a weight sensor, or a short range wireless transceiver.

7. The method of claim 5, wherein current occupants of the plurality of rooms have opted into a use of the plurality of sensors.

8. The method of claim 5, further comprising:
    inferring, by the processing system, current states of the plurality of rooms, based on the information collected from the plurality of sensors.

9. The method of claim 8, wherein the current states of the plurality of rooms include at least one of: no one is currently checked into a room of the plurality of rooms, someone is currently checked into a room of the plurality of rooms but not currently inside the room of the plurality of rooms, or someone is currently checked into a room of the plurality of rooms and is currently inside the room of the plurality of rooms.

10. The method of claim 8, wherein the current states of the plurality of rooms comprise respective service needs of the plurality of rooms.

11. The method of claim 10, wherein the current states of the plurality of rooms further comprise estimates of respective amounts of time needed to address the respective service needs of the plurality of rooms.

12. The method of claim 11, wherein the modifying comprises:
    presenting, by the processing system, a suggested order in which to address the respective service needs of the plurality of rooms.

13. The method of claim 12, wherein the suggested order is based on the estimates of the respective amounts of time needed to address the respective service needs of the plurality of rooms.

14. The method of claim 13, wherein the suggested order is further based on respective estimates of how long the plurality of rooms are likely to be empty.

15. The method of claim 1, wherein the augmented reality display comprises a pair of augmented reality glasses.

16. The method of claim 1, wherein the user is a member of a hospitality staff of a building in which the plurality of rooms is located.

17. The method of claim 1, wherein the single display presents, for each room of the plurality of rooms, a respective subset of the current information corresponding to the each room in an area of the single display that is superimposed over a real world view of the each room.

18. The method of claim 1, wherein the identifying the environment comprises:
    detecting an augmented reality marker located in the environment.

19. A non-transitory computer-readable medium storing instructions which, when executed by a processing system including at least one processor, cause the processing system to perform operations, the operations comprising:
    identifying an environment surrounding a user of an augmented reality display;
    identifying a relative location of the user within the environment;
    determining a field of view of the augmented reality display;

identifying a plurality of rooms within the field of view, wherein the user is located outside of the plurality of rooms;

querying a data source for current information about the plurality of rooms; and modifying the augmented reality display to present the current information about the plurality of rooms in a single display.

20. A device comprising:

a processing system including at least one processor; and a computer-readable medium storing instructions which, when executed by the processing system, cause the processing system to perform operations, the operations comprising:

identifying an environment surrounding a user of an augmented reality display;

identifying a relative location of the user within the environment;

determining a field of view of the augmented reality display;

identifying a plurality of rooms within the field of view, wherein the user is located outside of the plurality of rooms;

querying a data source for current information about the plurality of rooms; and modifying the augmented reality display to present the current information about the plurality of rooms in a single display.

* * * * *